United States Patent [19]
Duran

[11] Patent Number: 4,723,881
[45] Date of Patent: Feb. 9, 1988

[54] QUICK ACTION FASTENER ASSEMBLY

[75] Inventor: John A. Duran, Glendora, Calif.

[73] Assignee: Avibank Mfg., Inc., Burbank, Calif.

[21] Appl. No.: 922,072

[22] Filed: Oct. 20, 1986

[51] Int. Cl.$^4$ .............................................. F16B 21/18
[52] U.S. Cl. .................................. 411/353; 411/112; 411/999
[58] Field of Search ............... 411/353, 352, 111, 112, 411/965, 999, 103

[56] References Cited

U.S. PATENT DOCUMENTS

| | | | |
|---|---|---|---|
| 2,991,816 | 7/1961 | Harbison et al. | 411/999 |
| 3,294,140 | 12/1966 | Cosenza | 411/999 |
| 3,397,727 | 8/1968 | Orosz | 411/999 |
| 4,464,090 | 8/1984 | Duran | 411/353 |
| 4,594,040 | 6/1986 | Molina | 411/353 |

Primary Examiner—Neill Wilson
Attorney, Agent, or Firm—Poms, Smith, Lande & Rose

[57] ABSTRACT

A fastener assembly for joining a panel to a sub-panel comprising a receptacle assembly having a threaded stud secured to the undersurface of the sub-panel. The assembly includes a bolt having an enlarged head at one end and a nose at the other end. The panel has a countersunk opening aligned with an opening in the sub-panel. The bolt is threaded for threaded engagement to the stud. The body of the bolt has a plurality of spaced grooves extending longitudinally along the outer surface of the bolt body. A retainer surrounds the bolt body having spaced ears riding in the grooves and a stop ring in a groove adjacent the nose of the bolt stops the downward movement of the retainer. In this manner, the bolt may be disposed in the countersunk opening in the panel with the retainer on the blind side of the panel and the stop ring preventing movement of the retainer off of the bolt body thus retaining the bolt to the panel.

5 Claims, 7 Drawing Figures

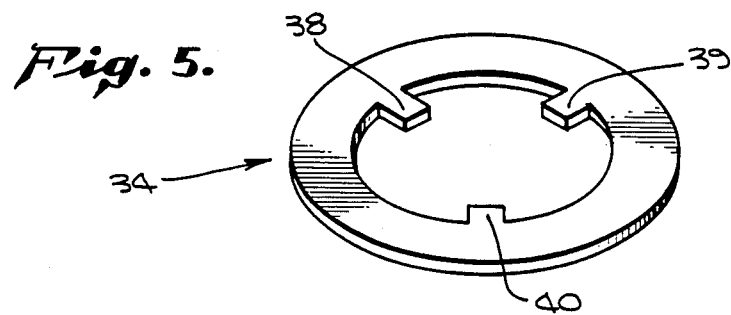
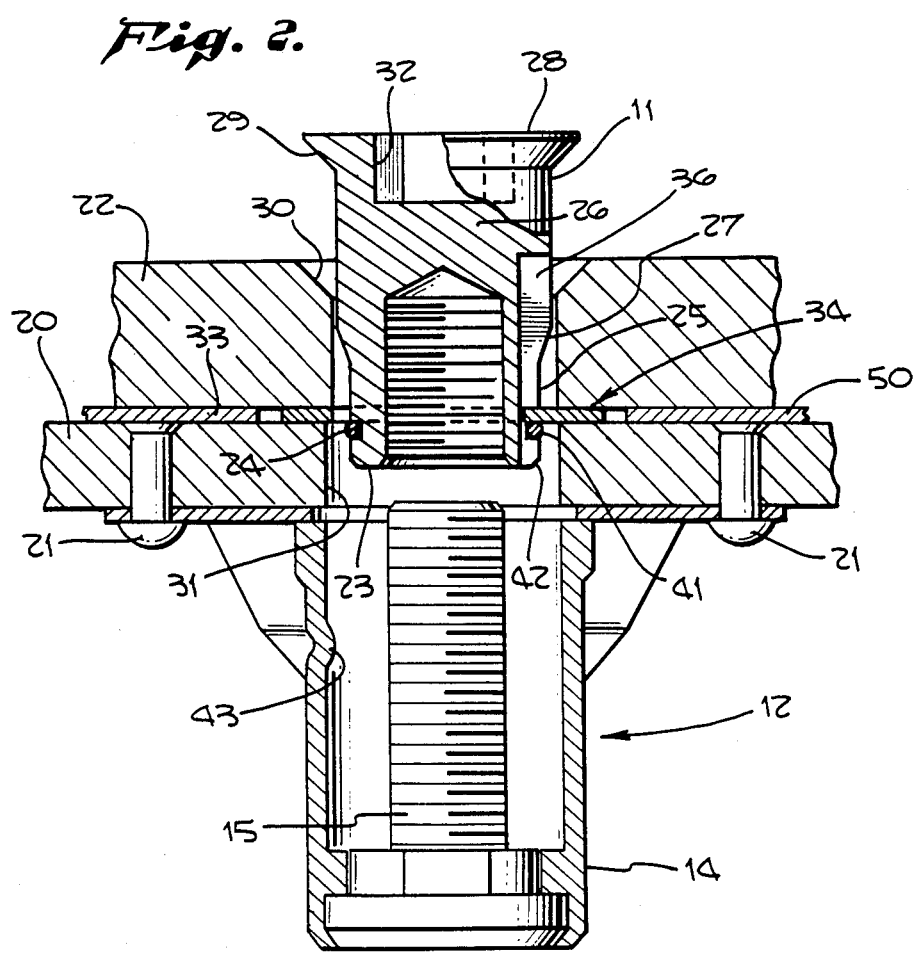

QUICK ACTION FASTENER ASSEMBLY

BACKGROUND OF THE INVENTION

1. Field of the Invention

The invention relates to quick action fasteners; and, more particularly, to improved quick action fasteners for panels of aircraft or the like.

2. Description of the Prior Art

Quick action fasteners are well known in the art. One such fastener is described in U.S. Pat. No. 2,991,816 to Harbison et al. These fasteners comprise a bolt body of stepped diameters and are used in aircraft panels having holes of certain diameters. These fasteners can be shifted in the panel holes, due to their stepped diameters, to compensate for slight misalignment of the holes in an abutting panel and sub-panel.

These prior art fasteners consist of a bolt having a retaining spring adapted to retain the bolt to a panel. The bolt is adapted to be threaded to a receptacle assembly mounted to a sub-panel. When torque is applied to the bolt, it is threaded to a stud in the receptacle assembly which draws the sub-panel to the panel and locks them together. When it is desired to unlock the panel from the sub-panel, the bolt is unscrewed from engagement with the stud and will be retained to the panel when free of the stud.

The retaining spring for the foregoing prior art bolt assembly fits into a countersunk hole in the sub-panel. These springs must expand and contract about the varying diameter sections of the bolt body. This can result in wear of the springs and fatigue of the same whereby they may come off the bolt body and be sucked into the aircraft engine causing damage to the aircraft. Of course, once the spring is free of the bolt body, the bolt can vibrate out of the panel hole and also be lost and sucked into the aircraft engine.

There is thus a need for a quick action aircraft fastener assembly which can be used in preexisting aircraft panel and sub-panel holes while providing for some misalignment of the holes without danger of loss of components of the fastener assembly. There is a need for such a fastener assembly having a retainer retaining the bolt of the fastener assembly, which bolt has a shank of varying diameters, to a panel wherein the retainer does not have to expand and contract as it passes over the varying diameters of the bolt body.

SUMMARY OF THE INVENTION

It is an object of this invention to provide an improved quick action fastener assembly having a retainer retaining a bolt with a shank of varying diameters to a panel without expansion and contraction of the retainer as it passes over the shank of the body of the bolt.

It is further an object of this invention to provide such a fastener assembly wherein the retainer is a solid flat metallic ring having index means guiding the same along the body of the bolt.

It is still further an object of this invention to carry out the foregoing object wherein the body of the bolt has a stop ring adapted to prevent the retainer from exiting off the bolt body.

These and other objects are preferably accomplished by providing a fastener assembly comprising a receptacle assembly having a threaded stud secured to the undersurface of the sub-panel. The assembly includes a bolt having an enlarged head at one end and a nose at the other end. The panel has a countersunk opening aligned with an opening in the sub-panel.

The bolt is threaded for threaded engagement to the stud. The body of the bolt has a plurality of spaced grooves extending longitudinally along the outer surface of the bolt body. A retainer surrounds the bolt body having spaced ears riding in the grooves and a stop ring in a groove adjacent the nose of the bolt stops the downward movement of the retainer. In this manner, the bolt may be disposed in the countersunk opening in the panel with the retainer on the blind side of the panel and the stop ring preventing movement of the retainer off of the bolt body thus retaining the bolt to the panel.

BRIEF DESCRIPTION OF THE DRAWING

FIG. 2 is a vertical sectional view of the fastener assembly of FIG. 1 installed in a panel and abutting sub-panel;

FIG. 5 is a perspective view of one element of the fastener assembly of FIGS. 1 to 4;

DESCRIPTION OF THE PREFERRED EMBODIMENT

Figure 1:
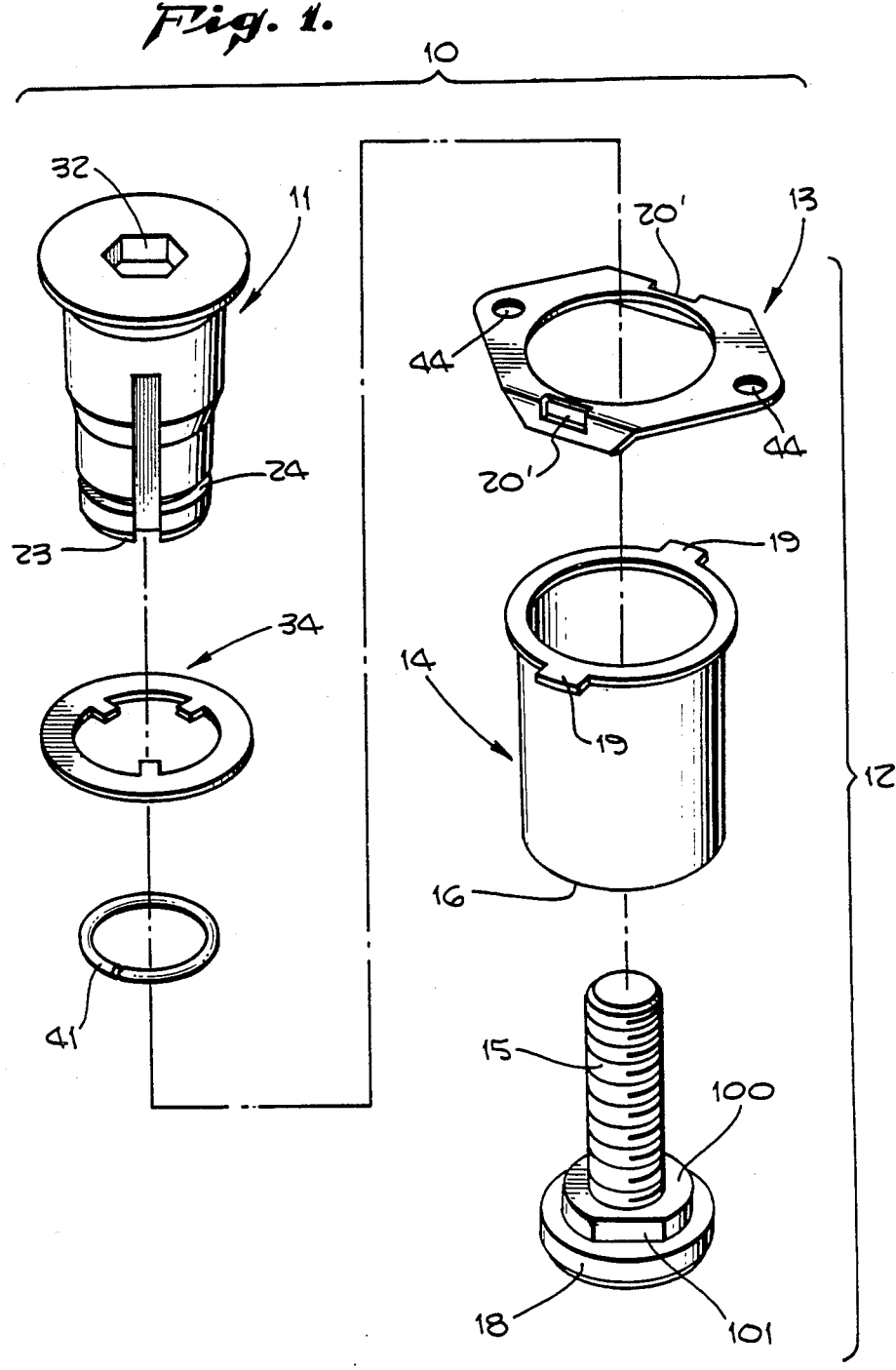
FIG. 1 is an exploded view of a fastener assembly in accordance with the teachings of the invention.
Figure 7:
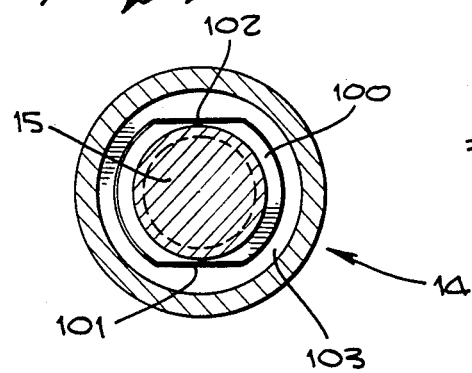
FIG. 7 is a view taken along lines VII—VII of FIG. 2.

Referring now to FIG. 1 of the drawing, there is shown a fastener assembly 10 comprising a bolt 11 adapted to mate with a receptacle assembly 12. Receptacle assembly 12 is comprised of a receptacle bracket or basket 13, a barrel 14 and an externally threaded stud 15. As seen in FIG. 2, the lower end 16 of barrel 14 is crimped about the base 18 of stud 15 to engage the stud 15 and connect the barrel 14 thereto. As seen in FIG. 1, the stud 15 has a boss 100 with flattened areas 101, 102 (see also FIG. 7). As seen in FIG. 2, barrel 14 has an inwardly extending peripheral wall 103 configured similarly to boss 100 (FIG. 7)). This is an anti-rotation feature preventing stud 15 from rotating within barrel 14 thereby allowing the stud 15 and barrel 14 to mate and lock and act as one unitary element. Barrel 14 also includes tabs 19 which are inserted in a pair of slots 20' formed in basket 13, thereby connecting the barrel 14 to the basket 13. Slots 20' are circumferentialy greater in length than the width of tabs 19 thereby permitting the barrel 14 and stud 15 to rotate to a limited degree with respect to basket 13. Basket 13 is secured to substructure 20 (FIG. 2) by any suitable means, such as rivets 21. Although receptacle assembly 12 and basket 13 have been described as an assembly of individual components, obviously a single element may be used.

Bolt 11 is shown in FIG. 2 in its disengaged and withdrawn position with respect to panel 22.

Figure 4:
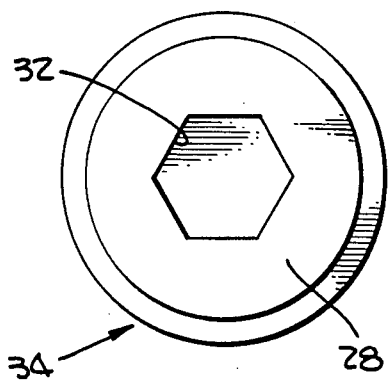
FIG. 4 is a view taken along lines IV—IV of FIG. 3.

Bolt 11 includes a blunt nose 23, an annular groove 24 adjacent nose 23 and a generally cylindrical lower shank portion 25 (FIG. 2). Bolt 11 also includes an upper generally cylindrical shank portion 26 of an outer diameter substantially greater than the outer diameter of lower shank portion 25. A tapered portion 27 provides transition from upper shank portion 26 to lower shank portion 25. Bolt 11 has an enlarged head 28 at the upper end of shank portion 26 which head 28 is tapered at tapered portion 29 on its undersurface leading to shank portion 26. Head 28 is adapted to abut or bear against a countersunk opening 30 (FIG. 2) in panel 22 when threaded to stud 15 as will be discussed. Countersunk opening 30 in panel 22 is aligned with an opening 31 through sub-panel 20 as shown in FIG. 2 A hex socket 32 (see also FIG. 4) may be provided in head 28 as is well known in the art for receiving a suitable wrench therein.

Figure 6:
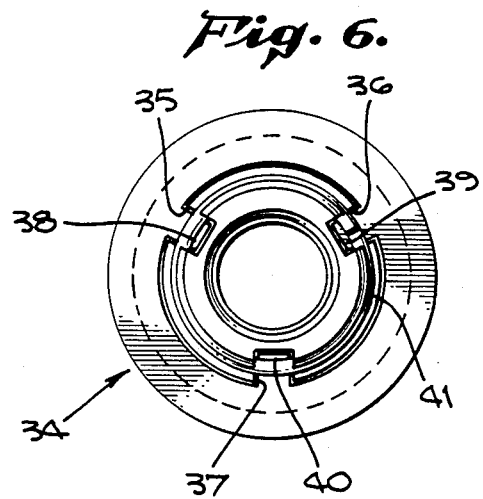
FIG. 6 is a view taken along lines VI—VI of FIG. 3.

As seen in FIGS. 1 and 6, bolt 11 includes a plurality, such as three, of longitudinally extending grooves 35 to 37 extending along the exterior thereof longitudinally and generally parallel to the longitudinal axis of bolt 11. These grooves 35 to 37 are preferably generally rectangular in cross section and may be of a depth at least substantially equal to the inward extent of the three ears 38 to 40 on annular ring 34 as seen in FIG. 5.

As seen in FIG. 1, an annular resilient locking ring 41 is provided of a diameter adapted to pass over nose 23 of bolt 11 and snap-fit into groove 24. The nose 23 of bolt 11 may have a terminal tapered end 42 leading therein to facilitate assembly of ring 41 and guide the nose 23 of bolt 11 into the countersunk opening 30 through panel 22.

The assembly of the elements of FIG. 1 will now be described. After formation of openings 30 and 31 through panel 22 and sub-panel 20, respectively, the receptacle assembly 12 is secured to the underside of sub-panel 20 by riveting basket 20 to panel 20 by rivets 21 passing through holes 44 (FIG. 1) in basket 20 and into sub-panel 20. The barrel 14 and stud 15 are secured thereto as heretofore described. One or more inwardly facing protrusions 43 may be provided on the exterior of barrel 14. These protrusions 43 provide a friction lock between the internal surface of barrel 14 and the exterior of bolt 11. Of course, any suitable thread lock as is known in the art may be used, such as a plastic insert installed through the side of barrel 14 or protrusions on the threads of the bolt.

Figure 3:
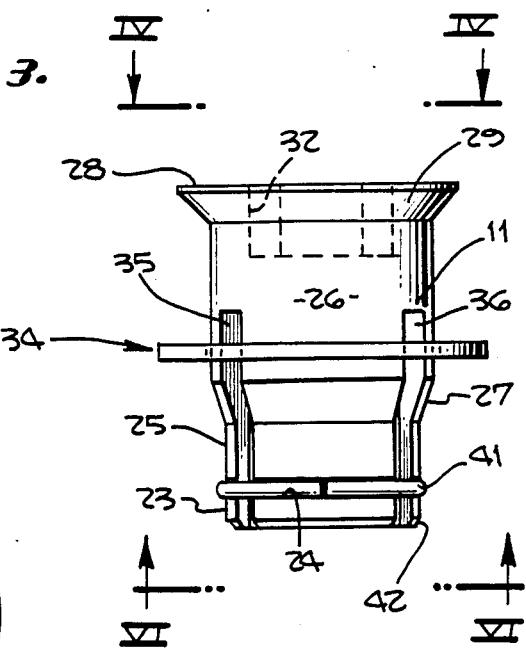
FIG. 3 is a vertical view of the bolt of FIG. 1 with the retainer and stop ring mounted thereto.

Bolt 11 is now inserted through countersunk opening 30 and into the ring 34 with ears 38 to 40 entering grooves 35 through 37, respectively, (FIG. 6) with retaining ring 41 snap fitting over nose 23 and into groove 24 as heretofore described. Thus, ring 34 cannot move off of bolt 11 because of its engagement with ring 41 (ears 38 to 40 abutting against ring 41 in it downwardly movement—see FIG. 3) nor move up past enlarged head 29. Thus, bolt 11 is trapped in opening 30 in panel 22.

Sub-panel 20 may now be brought into position abutting against panel 22 with ring 34 entering countersunk opening 33 and bolt 11 may be threaded to stud 15 on the receptacle assembly 12. Thus, sub-panel 20 is releasably secured to panel 22. The ring 34 rides in grooves 35 to 37 up and down over the differing diameter sections of bolt 11 as heretofore described.

The bolt assembly described herein can be used for conventional size diameter holes in aircraft panels. The bolt 11 has a tapered shank so that, as soon as it is withdrawn from the panel hole, there is no load bearing on the shank area of lesser outer diameter than the upper shank area. Thus, the tabs 38 to 40 of ring 34 and the grooves 35 to 37 of bolt 11 serve to maintain the advantages of known fasteners, such as the Harbison et al. fastener described and claimed in U.S. Pat. No. 2,991,816, while eliminating binding tht might occur between the spring and bolt body of such prior art fasteners. Further, the ring 34 is a solid metallic ring and will not wear and lose its resiliency as might the spring 44 of the prior art Harbison et al. fastener. Since the ring 34 disclosed herein does not have to expand and contract as it moves along the differing diameter sections of the bolt body, it is not subject to fatigue as is the Harbison et al. fastener. Applicant's ring 34 is easier to manufacture and less expensive than the spring device 44 of Harbison et al. Thus, applicant's ring 34 will not come off, due to the retainer ring 41 in groove 24, whereas the Harbison et al. spring 44 might fatigue and come off resulting in loss thereof and, possibly, sucking of the same into the engine aircraft resulting in considerable damage. Of course, once the spring 44 of Harbison et al. is lost, the bolt itself may also shake loose and fall out of the panel in which it is installed.

Thus, rotation of the sleeve bolt 11 will cause it to threadably engage stud 15 of the receptacle assembly 12. Preferably, bolt 11 and stud 15 are provided with double lead threads in order to decrease the time and motion required to remove and install the panel. In some applications, the thickness of panel 22 and sealing requirements may necessitate the use of a gasket 50 (FIG. 2), preferably the same thickness as ring 34, between the panel 22 and sub-panel 20. Alternatively, the gasket 50 can be eliminated and ring 34 may be disposed in a counterbore formed in either the upper surface of sub-panel 20 or in the lower or blind side of panel 22.

It can be seen that I have described a quick action fastener having a bolt which, when freed from engagement with the stud, is retained to the access panel. The parts are simple and easy to install. The ring 34 may be quickly and easily stamped out of a metal stamping forming ears 38 through 40. Thus, no careful machining of parts is necessary.

Although a specific receptacle assembly has been described, any suitable receptacle assembly may be used.

Although I have described the fastener assembly with reference to certain preferred embodiments, it is to be understood that the appended claims describe the scope of the invention and various changes and modifications may occur to one skilled in the art without departing from the scope of the invention.

I claim:

1. In a fastener assembly for joining a panel to a sub-panel comprising a receptacle assembly having a threaded stud secured to the undersurface of the sub-panel, a bolt having an enlarged head at one end and a nose at the other end, said nose being adapted to extend through a countersunk opening in said panel coaxially aligned with an opening in said sub-panel with the stud of said receptacle assembly coaxially aligned with both of said openings, said bolt having a shank leading from said enlarged head to said nose, said shank having a first outer diameter portion adjacent said head and a tapered portion extending from said first outer diameter portion to a second outer diameter portion adjacent said nose, or a lesser outer diameter than the outer diameter of said first outer diameter portion, said bolt being threaded for threaded engagement to said stud, said bolt having a groove adjacent its nose, the improvement which comprises:

a retainer having indexing means extending inwardly toward the central longitudinal axis thereof, said retainer comprising a flat metallic annular ring member having a plurality of spaced inwardly extending ears lying in the same horizontal plane as the remainder of said annular ring member;

said bolt having guide means extending longitudinally along the outer surface thereof receiving therein said ears for guiding said ring member along the body of said bolt, said guide means comprising a plurality of spaced grooves on the exterior of said shank extending from the terminal end of said nose, through said groove adjacent said nose, through said second outer diameter portion, through said tapered portion and through a portion of said first outer diameter portion terminating at a point spaced from said enlarged head; and a stop member mounted in said groove adjacent said nose, said spaced grooves on said shank extending through said groove adjacent said nose so that said stop member arrests the downward movement of said retainer thereby retaining said bolt to said panel when said bolt is disengaged from said stud, said ears freely riding in said grooves along said shank between said stop member and the terminal point of said grooves on said shank adjacent said head without obstruction.

2. In the assembly of claim 1 wherein said spaced grooves on said shank are of a substantially uniform depth along said bolt related to the length of said ears.

3. In the assembly of claim 1 wherein said stop member is a ring snap-fitting into said groove adjacent said nose.

4. In the assembly of claim 1 wherein at least three such spaced grooves on said shank are provided, said spaced ears comprising three such ears riding in respective ones of said spaced grooves on said shank.

5. In the assembly of claim 1 wherein said grooves on said shank are generally rectangular in cross section, said ears riding in said grooves on said shank being similarly configured.

* * * * *

UNITED STATES PATENT AND TRADEMARK OFFICE
CERTIFICATE OF CORRECTION

PATENT NO. : 4,723,881
DATED : February 9, 1988
INVENTOR(S) : John A. Duran

It is certified that error appears in the above-identified patent and that said Letters Patent are hereby corrected as shown below:

Col. 4, line 60, "or" should be --of--.

Signed and Sealed this

Ninth Day of August, 1988

Attest:

DONALD J. QUIGG

Attesting Officer

Commissioner of Patents and Trademarks